UNITED STATES PATENT OFFICE.

HARRY S. MORK, OF BOSTON, ARTHUR D. LITTLE, OF BROOKLINE, AND WILLIAM H. WALKER, OF NEWTON, MASSACHUSETTS, ASSIGNORS, BY MESNE ASSIGNMENTS, TO CHEMICAL PRODUCTS COMPANY, OF BOSTON, MASSACHUSETTS, A CORPORATION OF MAINE.

PROCESS OF MAKING CELLULOSE ESTERS.

SPECIFICATION forming part of Letters Patent No. 709,922, dated September 30, 1902.

Application filed January 17, 1902. Serial No. 90,207. (No specimens.)

*To all whom it may concern:*

Be it known that we, HARRY S. MORK, of Boston, county of Suffolk, ARTHUR D. LITTLE, of Brookline, county of Norfolk, and WILLIAM H. WALKER, of Newton, county of Middlesex, State of Massachusetts, have invented an Improvement in the Manufacture of Cellulose Esters, of which the following is a specification.

Our invention relates to the manufacture of cellulose esters, and especially to the manufacture of cellulose esters of the fatty acids— as, for example, cellulose acetate.

Cellulose esters, and more particularly cellulose acetate, have heretofore been prepared by various processes in which the esterification has been effected or promoted by the acid of various condensing agents, such as sulfuric acid, zinc chlorid, the acetates of zinc or magnesium, iodin, &c. These processes are open to objection either by reason of their complexity or the yield or quality of acetate produced or the difficulty of controlling the course of the reaction and the properties of the acetate or other ester formed. We have discovered that these difficulties may be overcome and that cellulose esters of the fatty acids, and especially cellulose acetate, may be readily produced by reacting upon cellulose with the appropriate fatty-acid anhydride, as acetic anhydride when cellulose acetate is desired, in the presence of a sulfonic acid or aromatic sulfonic acid, as phenol-sulfonic acid or naphthol-sulfonic acid.

In carrying out our invention we prefer to proceed as follows: For every one hundred parts of cellulose, as cotton or in other convenient form, we take three hundred and fifty parts of acetic anhydride or the equivalent amount of the anhydride of another fatty acid, five parts of phenol-sulfonic acid, and five parts of the sodium or other salt of phenol-sulfonic acid. In the above mixture the efficient condensing agent upon which we rely is the phenol-sulfonic acid; but the presence of the sodium phenol-sulfonate or its equivalent is beneficial in that it positively insures the absence of sulfuric acid during the operation, and thus enables the process to be carried to its completion easily and regularly and to be at all times under control.

The highly-destructive action of sulfuric acid upon cellulose is well known, and this acid has, moreover, a great tendency to degrade the cellulose esters of the fatty acids during the period of their formation or while they remain in contact with the sulfuric-acid mixture, and this tendency increases rapidly as the temperature is raised or as the proportion of sulfuric acid becomes greater. In order, therefore, to preclude the presence of sulfuric acid at any time in the reacting mixture, either as an impurity in the reagents or otherwise, we prefer to add to our mixture of cellulose the anhydride of a fatty acid and phenol-sulfonic acid, a suitable proportion of the sodium or other salt of phenol-sulfonic acid, or of another suitable compound in the presence of which sulfuric acid cannot exist as such.

For the dilution of the mixture above described we add about one hundred and fifty parts of glacial acetic acid in order that the bulk of liquid may be sufficient to thoroughly and evenly saturate the cotton or other form of cellulose used.

We prefer to conduct the esterification at about 80° centigrade and to stir the mixture, although constant stirring is not essential. The end of the reaction is shown by the disappearance of the fibrous structure of the cellulose, which condition is commonly reached in three to five hours.

The cellulose ester thus obtained is preferably precipitated and washed in water or other suitable liquid in the usual or other convenient way and dried.

What we do claim, and desire to secure by Letters Patent, is—

1. The process of making cellulose esters, which consists in treating cellulose with an acid anhydride in the presence of an aromatic sulfonic acid.

2. The process of making cellulose esters of fatty acids, which consists in treating cellulose with a fatty-acid anhydride in the presence of an aromatic sulfonic acid.

3. The process of making cellulose acetate, which consists in treating cellulose with acetic anhydride in the presence of an aromatic sulfonic acid.

4. The process of making cellulose esters, which consists in treating cellulose with an acid anhydride in the presence of a sulfonic acid.

5. The process of making cellulose esters of the fatty acids, which consists in treating cellulose with a fatty-acid anhydride in the presence of a sulfonic acid.

6. The process of making cellulose acetate, which consists in treating cellulose with acetic anhydride in the presence of a sulfonic acid.

7. The process of making cellulose esters, which consists in treating cellulose with an acid anhydride in the presence of an aromatic sulfonic acid, together with a salt of said acid.

8. The process of making cellulose esters of the fatty acids, which consists in treating cellulose with a fatty-acid anhydride in the presence of an aromatic sulfonic acid, together with a salt of said acid.

9. The process of making cellulose acetate, which consists in treating cellulose with acetic anhydride in the presence of an aromatic sulfonic acid, together with a salt of said acid.

10. The process of making cellulose esters, which consists in treating cellulose with an acid anhydride in the presence of a sulfonic acid, together with a salt of said acid.

11. The process of making cellulose esters of the fatty acids, which consists in treating cellulose with a fatty-acid anhydride in the presence of a sulfonic acid, together with a salt of said acid.

12. The process of making cellulose acetate, which consists in treating cellulose with acetic anhydride in the presence of a sulfonic acid, together with a salt of said acid.

13. The process of making cellulose acetate, which consists in treating cellulose with acetic anhydride, acetic acid, and phenol-sulfonic acid, substantially as described.

14. The process of making cellulose acetate, which consists in treating cellulose with acetic anhydride, acetic acid, phenol-sulfonic acid, and a salt of phenol-sulfonic acid in the proportion and under the conditions, substantially as described.

15. The process of making cellulose acetate, which consists in treating cellulose with acetic anhydride and naphthol-sulfonic acid.

16. The process of making cellulose acetate, which consists in treating cellulose with acetic anhydride, naphthol-sulfonic acid, and a salt of naphthol-sulfonic acid.

In testimony whereof we have signed our names to this specification in the presence of two subscribing witnesses.

HARRY S. MORK.
ARTHUR D. LITTLE.
WILLIAM H. WALKER.

Witnesses:
B. J. NOYES,
M. E. BILL.